United States Patent
Yaguchi et al.

(10) Patent No.: US 11,161,435 B2
(45) Date of Patent: Nov. 2, 2021

(54) VEHICLE SEAT

(71) Applicant: TOYOTA BOSHOKU KABUSHIKI KAISHA, Aichi (JP)

(72) Inventors: Daishi Yaguchi, Aichi (JP); Shun Fujishiro, Aichi (JP); Hideki Fujisawa, Aichi (JP); Hidefumi Sera, Aichi (JP); Takashi Hattori, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 58 days.

(21) Appl. No.: 16/777,043

(22) Filed: Jan. 30, 2020

(65) Prior Publication Data

US 2020/0247284 A1 Aug. 6, 2020

(30) Foreign Application Priority Data

Feb. 1, 2019 (JP) .............................. JP2019-017346

(51) Int. Cl.
*B60N 2/30* (2006.01)
*B60N 2/22* (2006.01)
*B60N 2/08* (2006.01)

(52) U.S. Cl.
CPC ......... *B60N 2/3047* (2013.01); *B60N 2/0837* (2013.01); *B60N 2/2227* (2013.01); *B60N 2/3011* (2013.01)

(58) Field of Classification Search
CPC .. B60N 2/3047; B60N 2/3045; B60N 2/3043; B60N 2/305; B60N 2/0837; B60N 2/0881; B60N 2/0843; B60N 2/2227; B60N 2/3011; B60N 2/3009; B60N 2/3004; B60N 2/3006; B60N 2/3013

USPC .................................. 297/316, 324, 317, 325
See application file for complete search history.

(56) References Cited

U.S. PATENT DOCUMENTS

| | | | | |
|---|---|---|---|---|
| 2006/0261624 A1* | 11/2006 | Okuda | ................. | B60N 2/0875 296/65.13 |
| 2008/0122279 A1* | 5/2008 | Park | ..................... | B60N 2/0875 297/332 |
| 2011/0241401 A1* | 10/2011 | Otsuka | ................. | B60N 2/3013 297/331 |
| 2015/0251569 A1* | 9/2015 | Kanai | ...................... | B60N 2/06 297/325 |
| 2016/0355108 A1* | 12/2016 | Kimata | .................... | B60N 2/12 |
| 2018/0244176 A1* | 8/2018 | Matsui | ................ | B60N 2/3047 |

(Continued)

FOREIGN PATENT DOCUMENTS

JP 2005-022551 1/2005

*Primary Examiner* — Mark R Wendell
(74) *Attorney, Agent, or Firm* — Greenblum & Bernstein, P.L.C.

(57) ABSTRACT

A vehicle seat of the present disclosure includes a seat cushion; a seatback; a sliding device; a first locking mechanism configured to restrict a sliding movement of a seat main body; a tip-up mechanism configured to rotationally displace the seat cushion upwardly from an occupiable position in conjunction with a frontward rotational movement of the seatback; a second locking mechanism configured to restrict a sliding movement of the seat main body when an elevation angle of the seat cushion exceeds a preset angle, and remove the restriction when the elevation angle is equal to or below a preset removal angle; and a first restrictor configured to restrict the elevation angle from being equal to or below the removal angle when the tip-up mechanism is activated.

11 Claims, 12 Drawing Sheets

(56) References Cited

U.S. PATENT DOCUMENTS

| | | | |
|---|---|---|---|
| 2019/0351789 A1* | 11/2019 | Matsuyama | B60N 2/3047 |
| 2020/0086768 A1* | 3/2020 | Line | B60N 2/0806 |
| 2020/0086769 A1* | 3/2020 | Aktas | B60N 2/146 |
| 2021/0061144 A1* | 3/2021 | Madhu | B60N 2/938 |

* cited by examiner

VEHICLE SEAT

CROSS-REFERENCE TO RELATED APPLICATIONS

This application claims the benefit of Japanese Patent Application No. 2019-017346 filed on Feb. 1, 2019 with the Japan Patent Office, the entire disclosure of which is incorporated herein by reference.

BACKGROUND

The present disclosure relates to a vehicle seat configured to be mounted to a vehicle.

For example, a vehicle seat disclosed in Japanese Unexamined Patent Application Publication No. 2005-022551 (Patent Document 1) includes a function to largely slidingly displace a seat main body frontwards. When this function (hereinafter also called a long-slide function) is active, a tip-up function for rotationally displacing a seat cushion upwardly from an occupiable position is activated in conjunction with a large frontward rotational movement of a seatback.

The invention disclosed in Patent Document 1 includes a locking mechanism for restricting the sliding movement of the seat main body when the seat main body has slid to a frontmost end/limit in response to the activation of the long-slide function. This restriction by the locking mechanism is removed when the seat cushion is placed in an occupiable state.

SUMMARY

In the invention disclosed in Patent Document 1, the restriction by the locking mechanism is removed when a large load, caused by the sliding movement of the seat main body to the frontmost end/limit, brings the seat cushion to the occupiable state.

Preferably, the present disclosure provides a vehicle seat configured to inhibit such removal of the restriction by the locking mechanism when the seat main body largely slides frontwards.

Desirably, a vehicle seat mounted to a vehicle comprises, for example, at least one of the following configuration requirements.

One configuration requirement is a seat cushion configured to support the buttocks of an occupant. The seat cushion is configured to rotate in up-down directions about its rear end. Another configuration requirement is a seatback configured to support the back of the occupant. The seatback is configured to rotate in front-rear directions about its lower end. Another configuration requirement is a sliding device configured to slidably support a seat main body that includes the seat cushion and the seatback. Another configuration requirement is a first locking mechanism configured to be located on the sliding device and restrict a sliding movement of the seat main body when the seat cushion and the seatback are placed in an occupiable state. Another configuration requirement is a tip-up mechanism configured to rotationally displace the seat cushion upwardly from an occupiable position in conjunction with a frontward rotational movement of the seatback. Another configuration requirement is a second locking mechanism configured to be located on the sliding device. The second locking mechanism is configured to restrict a sliding movement of the seat main body when an elevation angle of the seat cushion exceeds a preset angle by an operation of the tip-up mechanism and remove the restriction when the elevation angle is equal to or below a preset removal angle. Another configuration requirement is a first restrictor configured to restrict the elevation angle from being equal to or below the removal angle when the tip-up mechanism is activated.

In the vehicle seat, these configuration requirements help inhibit the seat cushion from being placed in the occupiable state when the seatback is rotated by the tip-up mechanism. Accordingly, the vehicle seat is configured to inhibit release of the second locking mechanism when the seat main body largely slides frontwards.

The vehicle seat may be configured as below.

Desirably, the tip-up mechanism comprises a third locking mechanism for retaining the seat cushion in the occupiable position. The third locking mechanism includes an engagement pin and an engagement hook. Desirably, the engagement pin is located in the seat cushion. Desirably, the engagement hook is rotationally displaceable between a hook engaged position, which is for an engagement with the engagement pin, and a hook disengaged position where the engagement is released. Desirably, the first restrictor is located in the engagement hook and configured to come into contact with the engagement pin and thereby restrict the elevation angle from being equal to or below the removal angle when the tip-up mechanism is activated. Accordingly, the vehicle seat is enabled to inhibit a release of the second locking mechanism by using the already-existing engagement hook.

The vehicle seat further comprises a cushion center located at a rotation center of the seat cushion; a hook center located at a rotation center of the engagement hook; a contact point of the first restrictor that contacts the engagement pin; and a longitudinal line that passes through the contact point and the hook center. Desirably, the first restrictor includes a curved surface, and a curvature center of the contact point is located on the longitudinal line or closer to the cushion center than to the longitudinal line. The engagement hook is thereby restricted from being rotationally displaced to the hook engaged position when the engagement hook is pressed by the engagement pin.

The engagement hook comprises an approximately U-shaped recess that allows entrance and exit of the engagement pin, and a push slope that extends from the recess in a direction away from the recess and continues from an inside wall surface of the recess. Desirably, the push slope is configured to allow a force, which is for moving the engagement pin apart from the recess, to act on the engagement pin when the engagement hook is rotationally displaced from the hook engaged position towards the hook disengaged position. The third locking mechanism is thereby reliably released.

Desirably, the push slope is configured such that, when the push slope is contacting the engagement pin, a distance between the push slope and the cushion center increases as the distance between the push slope and the recess increases. The third locking mechanism is thereby reliably released.

Desirably, the tip-up mechanism comprises a rotation plate that is configured to be rotationally displaced in conjunction with a rotational movement of the seatback and comprises a press pin formed on a leading end of the rotation plate. Desirably, the engagement hook comprises a first cam surface and a second cam surface. Desirably, the first cam surface and the second cam surface are configured to slide-contact the press pin in conjunction with a rotational displacement of the rotation plate. Desirably, the first cam surface and the second cam surface are configured to receive a force to rotationally displace the engagement hook in response to the slide-contact with the press pin. Desirably, the press pin is configured to allow a force, which is for rotationally displace the engagement hook from the hook engaged position towards the hook disengaged position, to act on the first cam surface and the second cam surface when the press pin reaches the second cam surface via the first cam surface. Desirably, the first cam surface and the second cam surface are configured such that a rotational displacement angle of the press pin contacting the second cam surface is smaller than a rotational displacement angle of the press pin contacting the first cam surface. The engagement hook is thereby inhibited from being rotationally displaced to a position where the engagement pin can no longer contact the first restrictor.

Desirably, a curvature center of the first cam surface and the press pin are located on opposite sides of the first cam surface; and a curvature center of the second cam surface and the press pin are located on the same side of the second cam surface. The engagement hook is thereby inhibited from being rotationally displaced to a position where the engagement pin can no longer contact the first restrictor.

Desirably, the engagement hook comprises a third cam surface to which the press pin contacts when the engagement hook is placed in the hook disengaged position. Desirably, the third cam surface is configured to generate a force to rotationally displace the engagement hook from the hook disengaged position towards the hook engaged position when the press pin is displaced from the third cam surface towards the second cam surface. The engagement hook is thereby reliably rotationally displaced towards the hook engaged position.

Desirably, the third cam surface is configured such that a distance between a given point on the third cam surface and a rotation center of the rotation plate increases as a distance between the given point and the second cam surface decreases. In other words, the third cam surface is configured such that a distance between the third cam surface and the rotation center of the rotation plate taken at a front point of the third cam surface, which is proximal to the second cam surface, is greater than a distance between the third cam surface and the rotation center of the rotation plate taken at a rear point of the third cam surface, which is distal to the second cam surface. The engagement hook is thereby reliably rotationally displaced towards the hook engaged position.

Desirably, the vehicle seat comprises a second restrictor configured to restrict the engagement hook from rotating beyond a preset point when the engagement hook is rotationally displaced from the hook engaged position towards the hook disengaged position. It is thereby possible to reliably inhibit the engagement hook from being rotationally displaced to a position where the engagement pin can no longer contact the first restrictor.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

Figure 1:
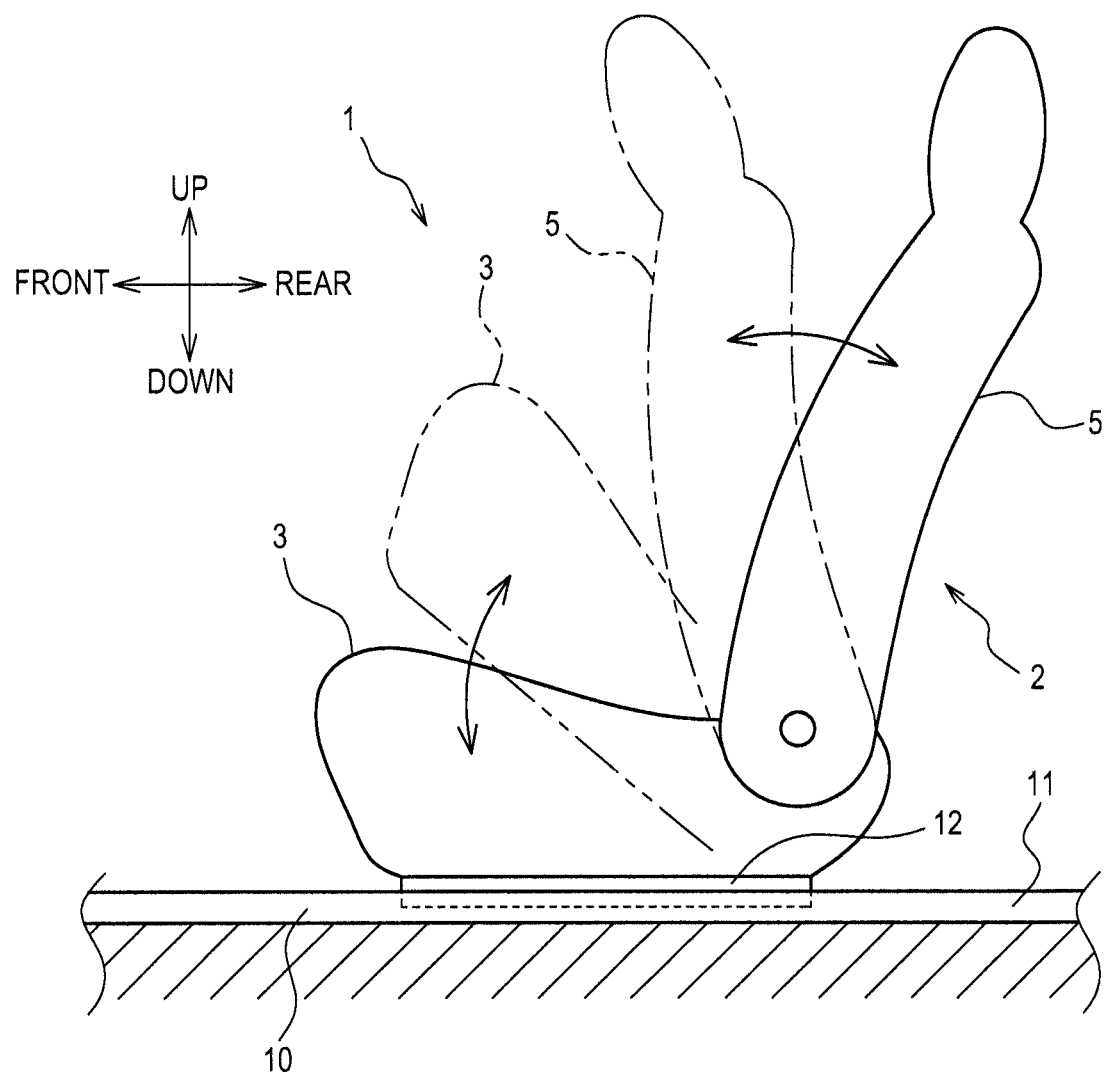
FIG. 1 is a diagram showing a vehicle seat.

Embodiments explained hereinafter show examples of embodiments that belong to the technical scope of the present disclosure. Matters to specify the invention recited in the claims are not limited to specific configurations and structures that are shown in the embodiments explained hereinafter.

In respect of a member or portion explained with at least a reference numeral, there is at least one in number of such a member or portion unless the number is otherwise specified as "only one of" and the like. In other words, there may be two or more of such a member or portion when the number is not specified as "only one of" and the like.

The present embodiments are examples of a seat (hereinafter referred to as vehicle seat) configured to be mounted to a vehicle such as a car. Arrows and the like indicating directions in the drawings are made for easy understanding of relationship between the drawings. Drawings including slant lines and the like do not always show a cross-sectional view.

Accordingly, the invention of the present disclosure should not be limited by the directions shown in the drawings. The directions in the drawings are defined in relation to the vehicle seat according to the present embodiments assembled to a vehicle.

1. Outline of Vehicle Seat

Figure 7:
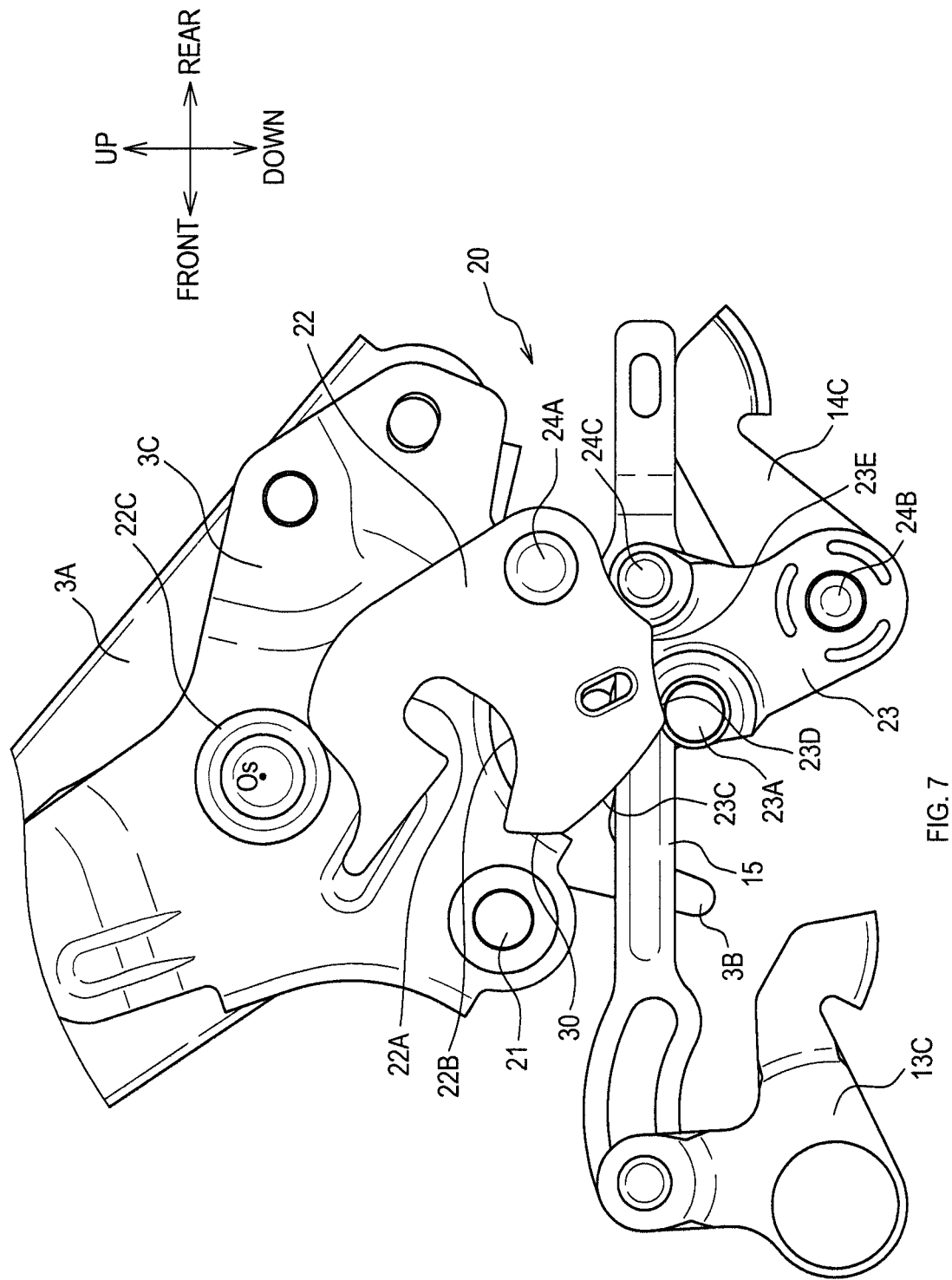
FIG. 7 is a diagram showing elements such as the tip-up mechanism.
Figure 8:
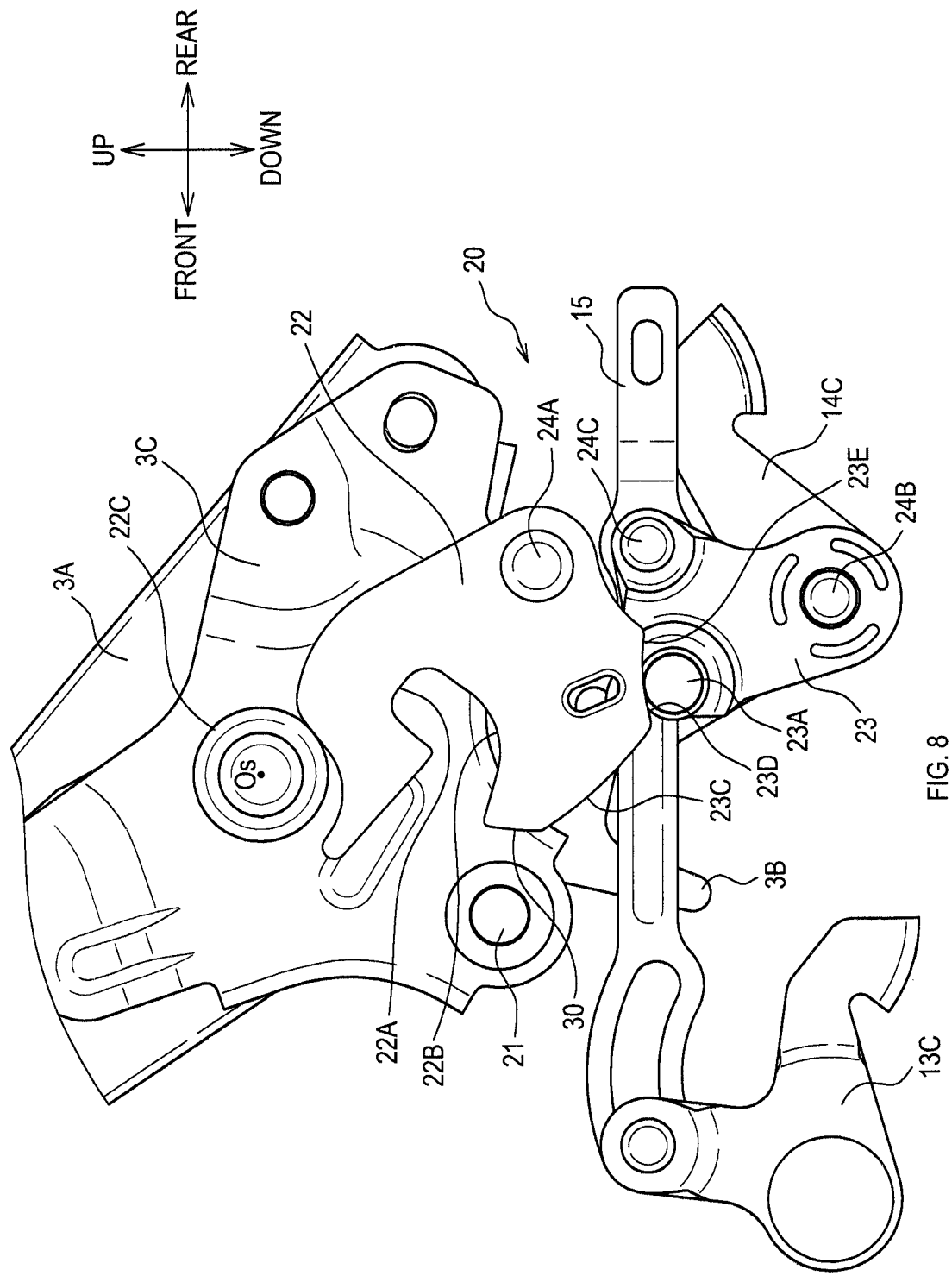
FIG. 8 is a diagram showing elements such as the tip-up mechanism.

As shown in FIG. 1, a vehicle seat 1 comprises at least a seat main body 2, a sliding device 10, a tip-up mechanism 20 (see FIG. 2), and a first restrictor 30 (see FIG. 7). The seat main body 2 comprises at least a seat cushion 3 and a seatback 5.

The seat cushion 3 is a portion for supporting the buttocks of the occupant. The seatback 5 is a portion for supporting the back of the occupant. The sliding device 10 is for slidably supporting the seat main body 2.

The seat cushion 3 is rotatable in up-down directions about its rear end. More specifically, the seat cushion 3 is displaceable between the occupiable position (shown in solid line in FIG. 1) and a tip-up position, where the seat cushion 3 is rotationally displaced upwardly from the occupiable position (shown in two-dot-chain line in FIG. 1).

The seatback 5 is rotatable in front-rear directions about its lower end. More specifically, the seatback 5 is displaceable between the occupiable position (shown in solid line in FIG. 1) and a position where the seatback 5 is rotationally displaced frontwards from the occupiable position (shown in two-dot-chain line in FIG. 1).

2. Sliding Device
<Outline of Sliding Device>

The seat main body 2 is slidably supported by two sliding devices 10. A first sliding device 10 among the two sliding devices 10 is arranged on a first end of the seat main body 2 along a seat-width axis (for example, left end). A second sliding device 10 among the two sliding devices 10 is arranged on a second end of the seat main body 2 along the seat-width axis (for example, right end).

The configuration of the first sliding device 10 and the configuration of the second sliding device 10 are basically identical. Hereinafter, the first sliding device 10 arranged on the first end of the seat main body 2 along the seat-width axis is abbreviated to a sliding device 10; and the sliding device 10 will be explained.

Figure 2:
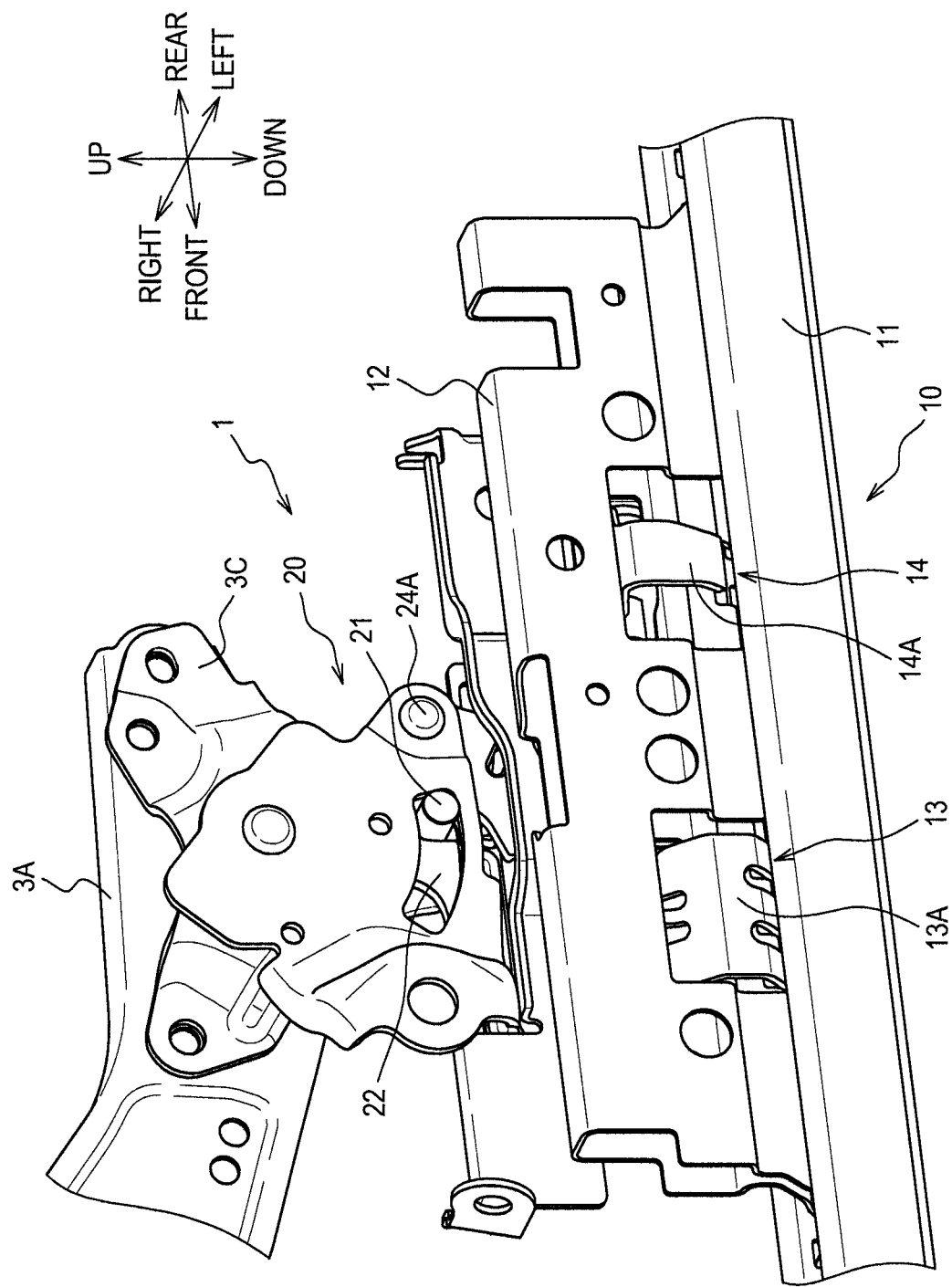
FIG. 2 is a diagram showing elements such as a tip-up mechanism and a sliding device.

As shown in FIG. 2, the sliding device 10 comprises at least a fixed rail 11, a movable rail 12, a main locking mechanism 13, and a sub locking mechanism 14. The fixed rail 11 is a member directly or indirectly fixed to the a vehicle.

A longitudinal direction of the fixed rail 11 coincides with the front-rear directions of the vehicle. The size of the fixed rail 11 in the longitudinal direction is greater than a front-to-rear length of the seat cushion 3.

The movable rail 12 is slidable with respect to the fixed rail 11. The movable rail 12 is a member to which the seat main body 2 is fixed. More specifically, a cushion frame 3A that forms a framework of the seat cushion 3 is fixed to the movable rail 12 via the tip-up mechanism 20.

<Main Locking Mechanism and Sub Locking Mechanism>

The main locking mechanism 13 is one example of a first locking mechanism that can restrict the sliding movement of the seat main body 2 when the seat cushion 3 and the seatback 5 are placed in the occupiable state. In other words, the main locking mechanism 13 serves to restrict the sliding movement of the movable rail 12 or remove the restriction in response to manipulation of a user when the seat cushion 3 and the seatback 5 are in the occupiable state. The user is an occupant of the vehicle seat 1, a person who uses the vehicle seat 1, and the like.

The sub locking mechanism 14 is one example of the second locking mechanism that can restrict the sliding movement of the seat main body 2. More specifically, the sub locking mechanism 14 restricts the sliding movement of the seat main body 2 when an elevation angle of the seat cushion 3 exceeds a preset angle, and removes the restriction when the elevation angle is equal to or below a preset removal angle.

A time when the elevation angle of the seat cushion 3 exceeds the preset angle is, for example, a time when the seat cushion 3 is placed in the tip-up position (position shown in two-dot-chain line in FIG. 1) by an operation of the tip-up mechanism 20.

The configuration of the main locking mechanism 13 and the configuration of the sub locking mechanism 14 are basically identical. Specifically, the locking mechanism 13 and the sub locking mechanism 14 respectively comprise a lock bar 13A and a lock bar 14A.

Figure 3:
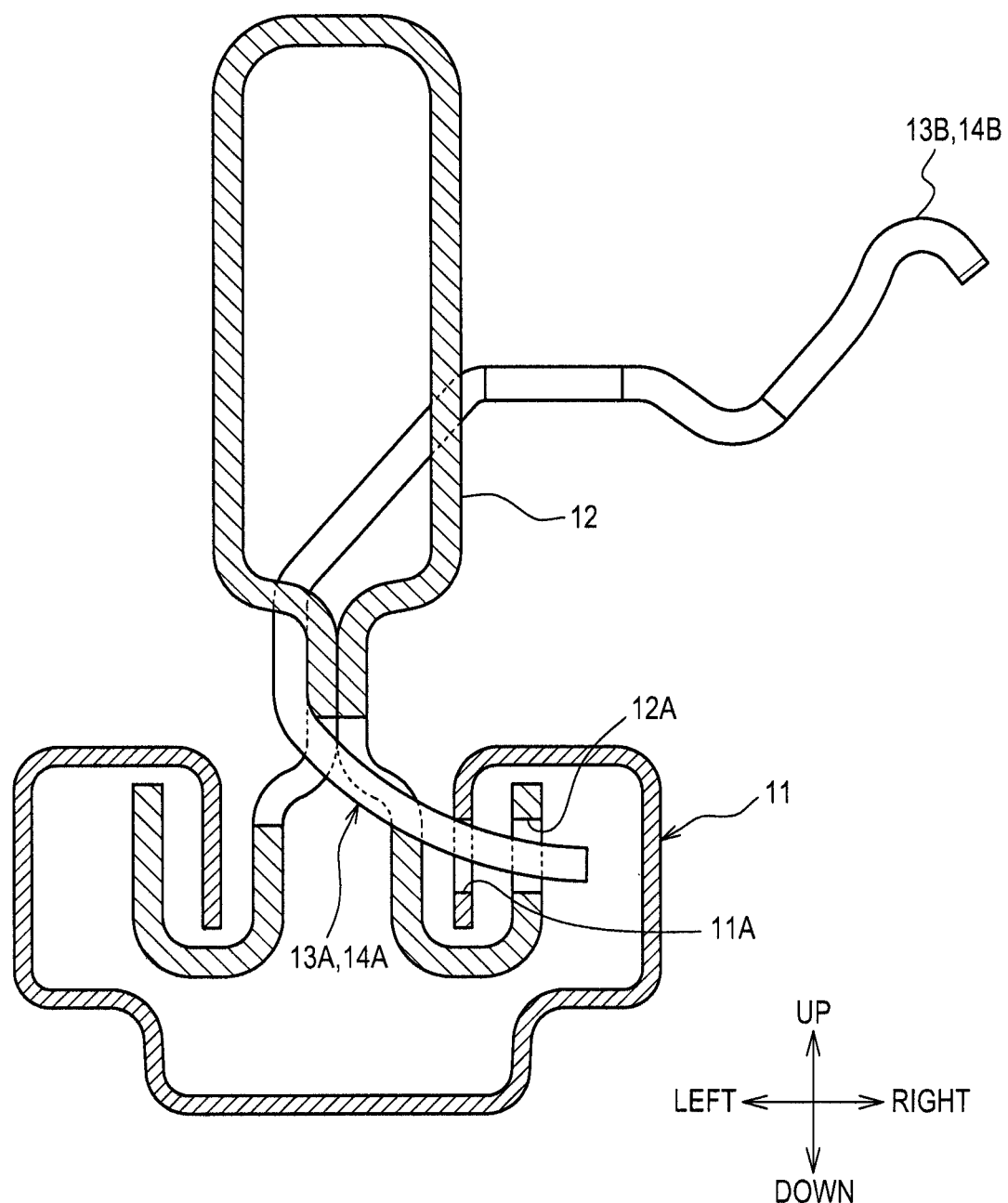
FIG. 3 is a diagram showing a main locking mechanism and a sub locking mechanism.

The lock bars 13A, 14A are displaceable between a lock bar engaged position for an engagement with the fixed rail 11 and the movable rail 12 (see FIG. 3) and a lock bar disengaged position where the engagement is released. More specifically, as shown in FIG. 3, the fixed rail 11 and the movable rail 12 respectively have a lock hole 11A and a lock hole 12A for respectively allowing the lock bars 13A, 14A to pass through.

In other words, the lock bars 13A, 14A are displaceable between the lock bar engaged position passing the lock holes 11A, 12A (position shown in FIG. 3) and the lock bar disengaged position retrieved from at least one of the lock holes 11A, 12A.

In a state where the lock bars 13A, 14A are placed in the lock bar engaged position, the sliding movement of the movable rail 12 is restricted. In a state where the lock bars 13A, 14A are placed in the lock bar disengaged position, the restriction is removed to allow the movable rail 12 to slide.

The main locking mechanism 13 and the sub locking mechanism 14 each have a locking spring (not shown) that exerts an elastic force on the lock bar 13A and the lock bar 14A respectively. The elastic force of the locking springs acts to keep the lock bars 13A, 14A in the lock bar engaged position.

The lock bar 13A comprises a manipulated portion 13B. The lock bar 14A comprises a manipulated portion 14B. For example, if a downward operation force acts on each of the manipulated portions 13B, 14B, then the lock bars 13A, 14A affected by the operation force are displaced into the lock bar disengaged position.

Figure 4:
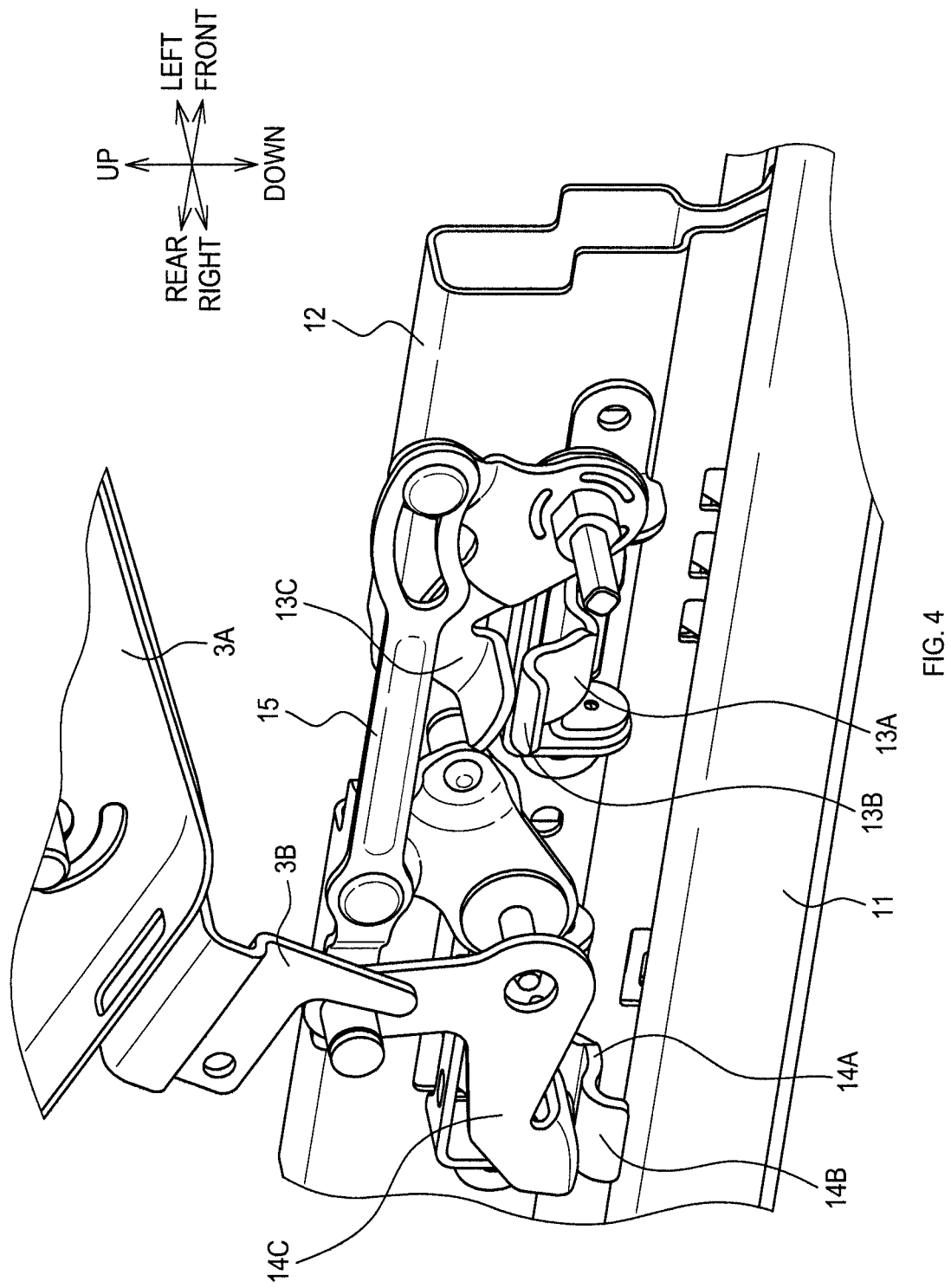
FIG. 4 is a diagram showing the main locking mechanism and the sub locking mechanism.

When the operation force disappears, the locking spring brings the lock bars 13A, 14A back to the lock bar engaged position. As shown in FIG. 4, the main locking mechanism 13 and the sub locking mechanism 14 respectively comprise an operation lever 13C and an operation lever 14C.

The operation lever 13C (hereinafter referred to as first operation lever 13C) is an operation member configured to allow the operation force to act on the manipulated portion 13B of the lock bar 13A. The operation lever 14C (hereinafter referred to as second operation lever 14C) is an operation member configured to allow the operation force to act on the manipulated portion 14B of the lock bar 14A.

The main locking mechanism 13 and the sub locking mechanism 14 each have a lever spring (not shown) that exerts an elastic force on the first operation lever 13C and the second operation lever 14C.

The elastic forces of the lever springs act in directions to move the first operation lever 13C and the second operation lever 14C respectively apart from the manipulated portion 13B and the manipulated portion 14B. The first operation lever 13C allows the operation force to act on the manipulated portion 13B in response to being rotated by the operation force via a manipulation link 15.

More specifically, the first operation lever 13C is rotated and presses the manipulated portion 13B when the manipulation link 15 is pulled rearwards from the position shown in FIG. 4, which, brings the main locking mechanism 13 into a disengaged state. When the manipulation link 15 returns to the position shown in FIG. 4, the operation force disappears and the main locking mechanism 13 returns to an engaged state.

The manipulation link 15 is displaced rearwards from the position shown in FIG. 4 in response to the user's directive manipulation to activate a long-slide function (walk-in function). The manipulation link 15 returns to the position shown in FIG. 4 when the seatback 5 returns to the occupiable position from a frontward tilted position (position shown in two-dot-chain line in FIG. 1).

The seat cushion 3 (cushion frame 3A) comprises a third operation lever 3B. The third operation lever 3B is displaced integrally with the seat cushion 3. The third operation lever 3B allows the operation force to act on the second operation lever 14C when the seat cushion 3 is placed in the occupiable state.

In other words, when the seat cushion 3 is placed in the occupiable state, the manipulated portion 14B is retained under the effect of the operation force via the second operation lever 14C and the third operation lever 3B. Since the lock bar 14A is retained in the lock bar disengaged position when the seat cushion 3 is placed in the occupiable state, the restriction by the sub locking mechanism 14 is removed.

When the seat cushion 3 is displaced into the tip-up position, the third operation lever 3B is displaced, and the second operation lever 14C moves apart from the manipulated portion 14B by the elastic force of the lever spring. It means that the lock bar 14A is placed in the lock bar engaged position when the seat cushion 3 is displaced into the tip-up position, and accordingly, the sub locking mechanism 14 restricts the sliding movement of the movable rail 12.

3. Tip-Up Mechanism

<Outline of Tip-Up Mechanism>

The tip-up mechanism 20 is configured to rotationally displace the seat cushion 3 from the occupiable position towards the tip-up position in conjunction with the frontward rotational movement of the seatback 5. The tip-up mechanism 20 is activated upon a directive manipulation by the user.

Figure 5:
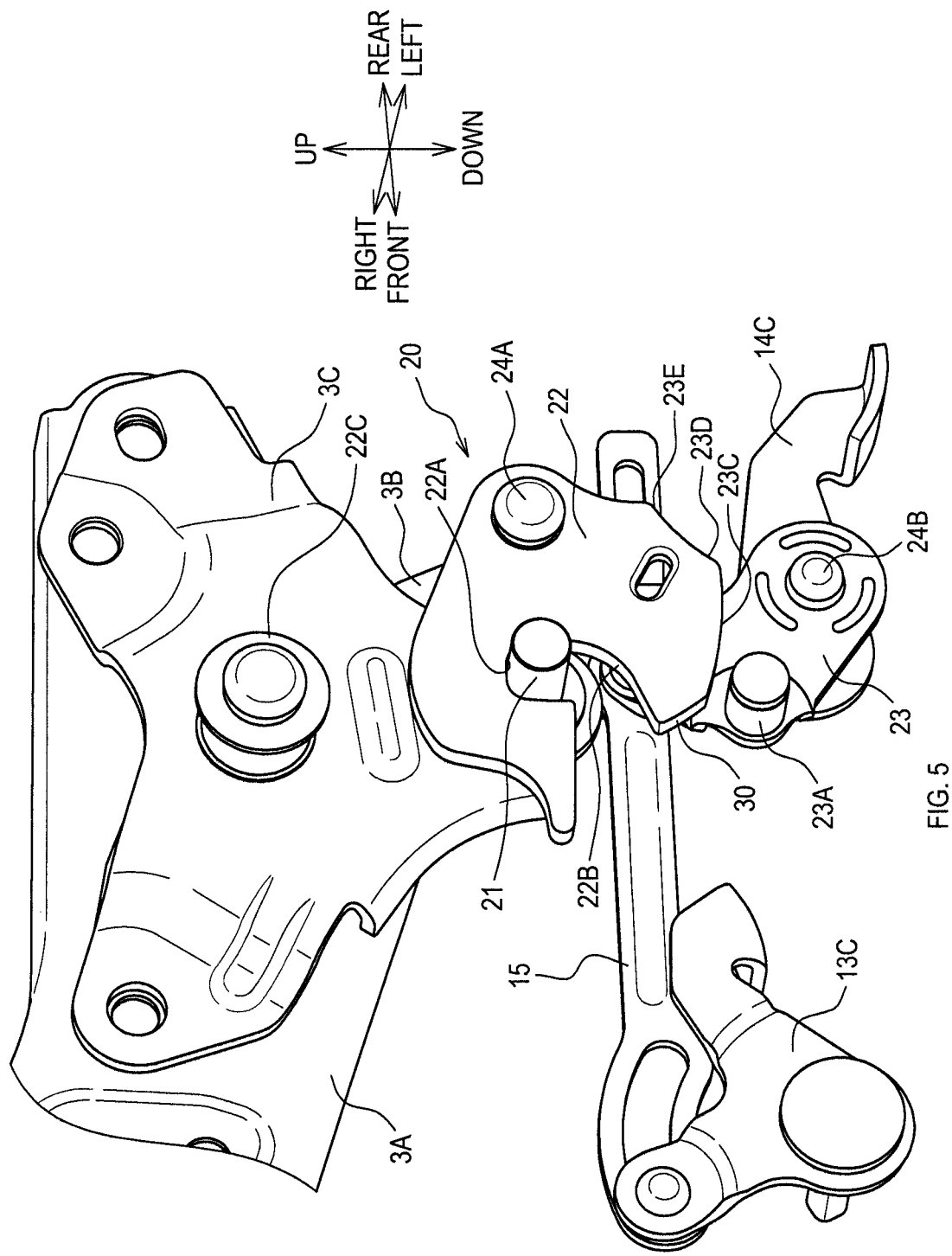
FIG. 5 is a diagram showing elements such as the tip-up mechanism.
Figure 6:
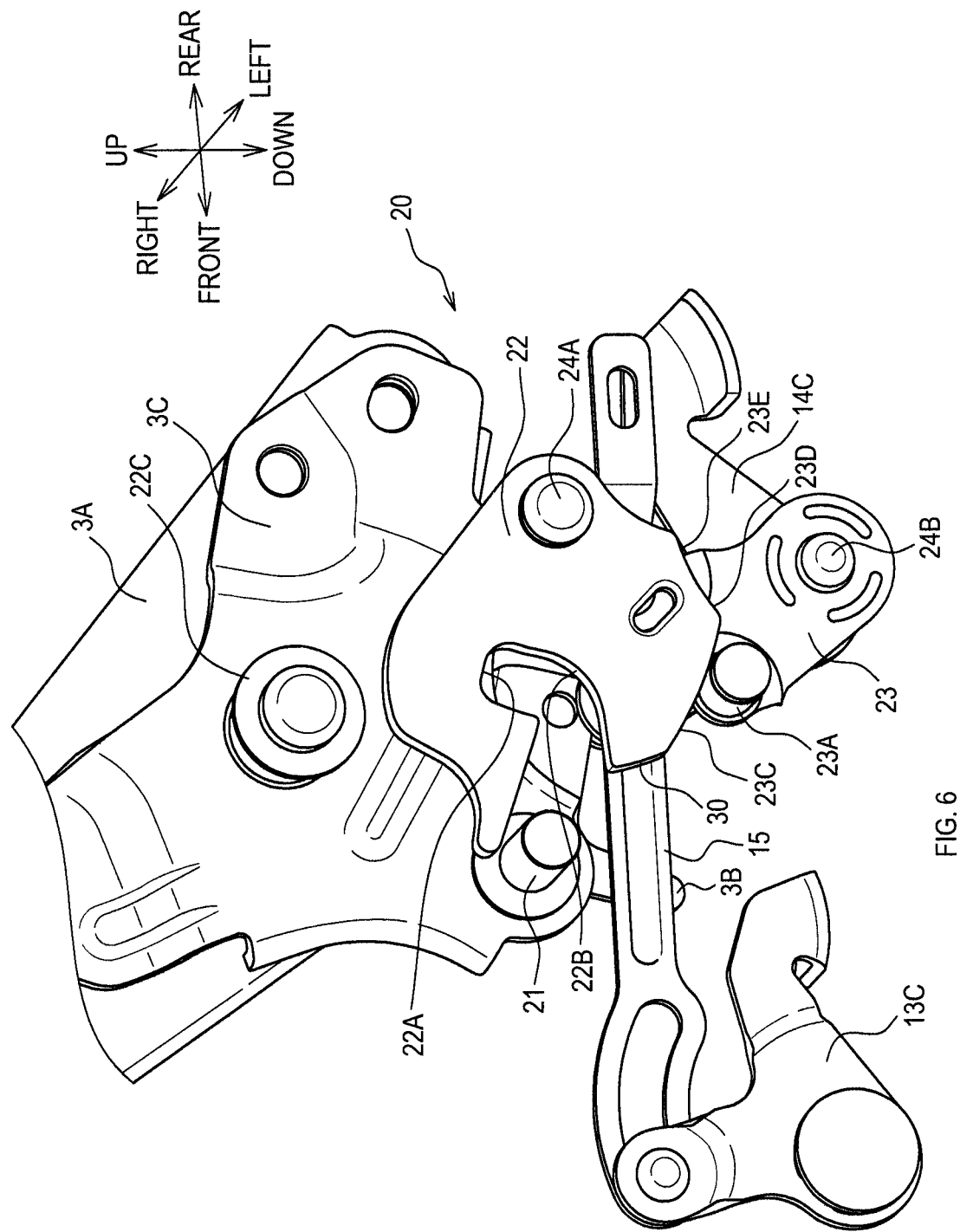
FIG. 6 is a diagram showing elements such as the tip-up mechanism.

As shown in FIG. 5, the tip-up mechanism 20 comprises at least an engagement pin 21, an engagement hook 22, a rotation plate 23, and a tip-up spring (not shown). The tip-up spring exerts an elastic force to rotationally displace the seat cushion 3 towards the tip-up position.

The engagement pin 21 is located in the seat cushion 3. The engagement pin 21 is fixed to the cushion frame 3A via a bracket 3C. The engagement hook 22 is rotationally displaceable between a hook engaged position (see FIG. 5) and a hook disengaged position (see FIG. 6 to FIG. 9).

The hook engaged position is where the engagement hook 22 can be engaged with the engagement pin 21. The hook disengaged position is where the engagement of the engagement hook 22 with the engagement pin 21 can be released. The engagement hook 22 is coupled and secured to the movable rail 12 and other elements via a bracket (not shown).

In a state where the engagement hook 22 is engaged with the engagement pin 21, the seat cushion 3 is retained in the occupiable position. In other words, the engagement pin 21 and the engagement hook 22 function as the third locking mechanism for retaining the seat cushion 3 in the occupiable position.

When the engagement hook 22 is placed in the hook engaged position, the first operation lever 13C is placed apart from the manipulated portion 13B, and the second operation lever 14C is placed in a position to allow an operation force to act on the manipulated portion 14B (see FIG. 5).

In other words, when the engagement hook 22 is placed in the hook engaged position, the lock bar 13A is placed in the lock bar engaged position and the main locking mechanism 13 is in a locked state, and the lock bar 14A is placed in the lock bar disengaged position and the sub locking mechanism 14 is in an unlocked state.

When the engagement hook 22 is placed in the hook disengaged position, the first operation lever 13C is placed in a position to allow an operation force to act on the manipulated portion 13B, and the second operation lever 14C is placed apart from the manipulated portion 14B (see FIG. 6 to FIG. 9).

In other words, when the engagement hook 22 is placed in the hook disengaged position, the lock bar 13A is placed in the lock bar disengaged position and the main locking mechanism 13 is in the unlocked state, and the lock bar 14A is placed in the lock bar engaged position and the sub locking mechanism 14 is in the locked state.

<Engagement Hook>

Figure 10:
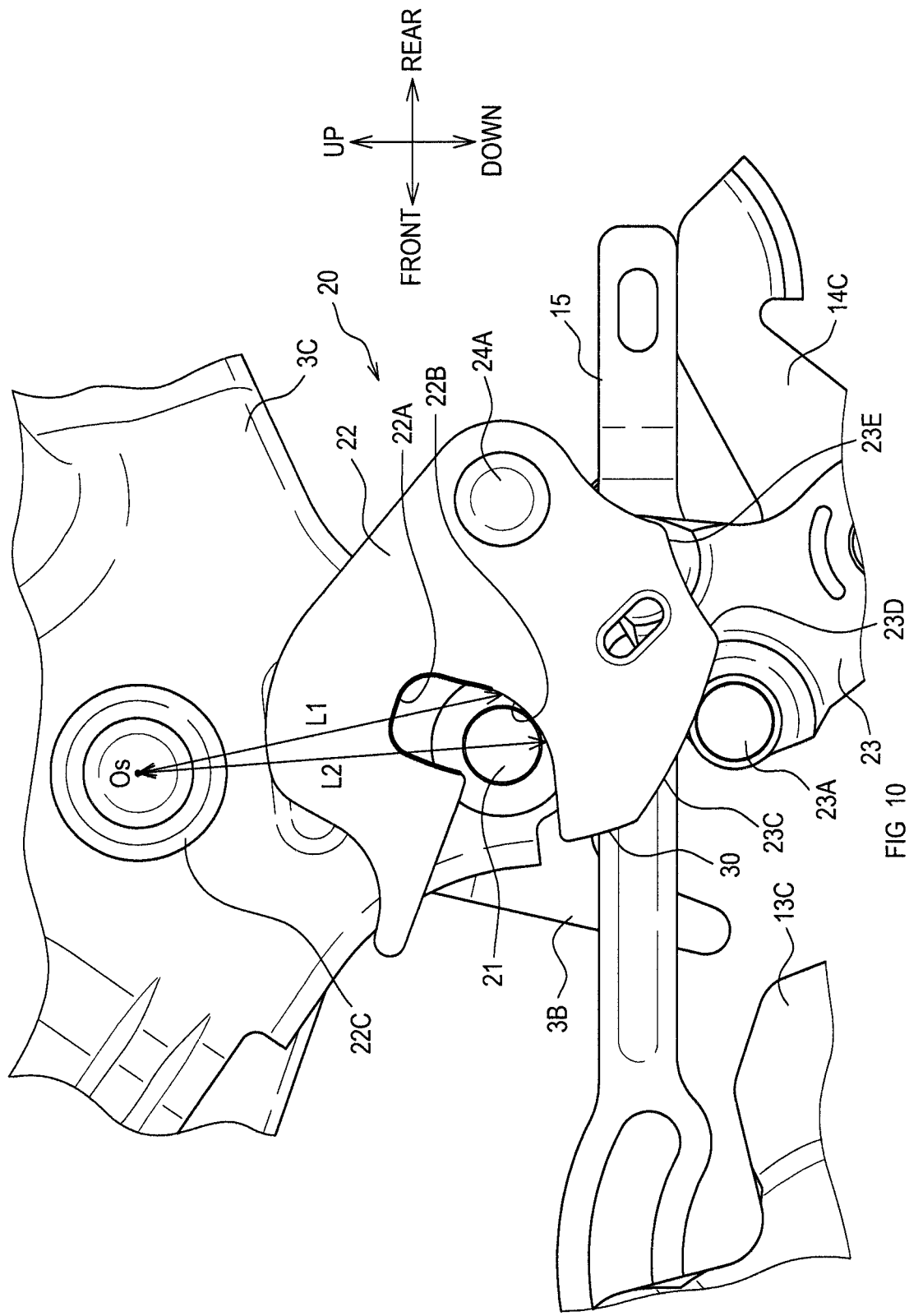
FIG. 10 is a diagram showing elements such as the tip-up mechanism.

As shown in FIG. 10, the engagement hook 22 is rotatably supported by a shaft 24A. The engagement hook 22 constantly receives an elastic force from a hook spring (not shown). This elastic force acts in a direction to rotate the engagement hook 22 towards the hook engaged position.

The engagement hook 22 comprises at least a recess 22A (area shown in bold solid line in FIG. 10) and a push slope 22B. The recess 22A is an approximately U-shaped groove that allows entrance and exit of the engagement pin 21 (see FIG. 5 to FIG. 10).

As shown in FIG. 10, the push slope 22B is a surface that is extended from an inside wall surface of the recess 22A in a direction away from the recess 22A and that can come into contact with the engagement pin 21. The push slope 22B is configured to produce a separation force.

The separation force allows the engagement pin 21 to move apart from the engagement hook 22. The separation force acts on the engagement pin 21 when the engagement hook 22 is rotationally displaced from the hook engaged position towards the hook disengaged position.

More specifically, the push slope 22B, being in a state shown in FIG. 10 where the engagement pin 21 contacts the push slope 22B (hereinafter referred to as contacting push slope), is configured such that a distance between the contacting push slope and a cushion center Os increases as the distance between the contacting push slope and the recess 22A increases.

The cushion center Os is a rotation center of the seat cushion 3. When the distance between the cushion center Os and one end of the contacting push slope proximal to the recess 22A is L1 and the distance between the cushion center Os and a point on the contacting push slope distal to the recess 22A is L2, L2 is greater than L1.

Figure 9:
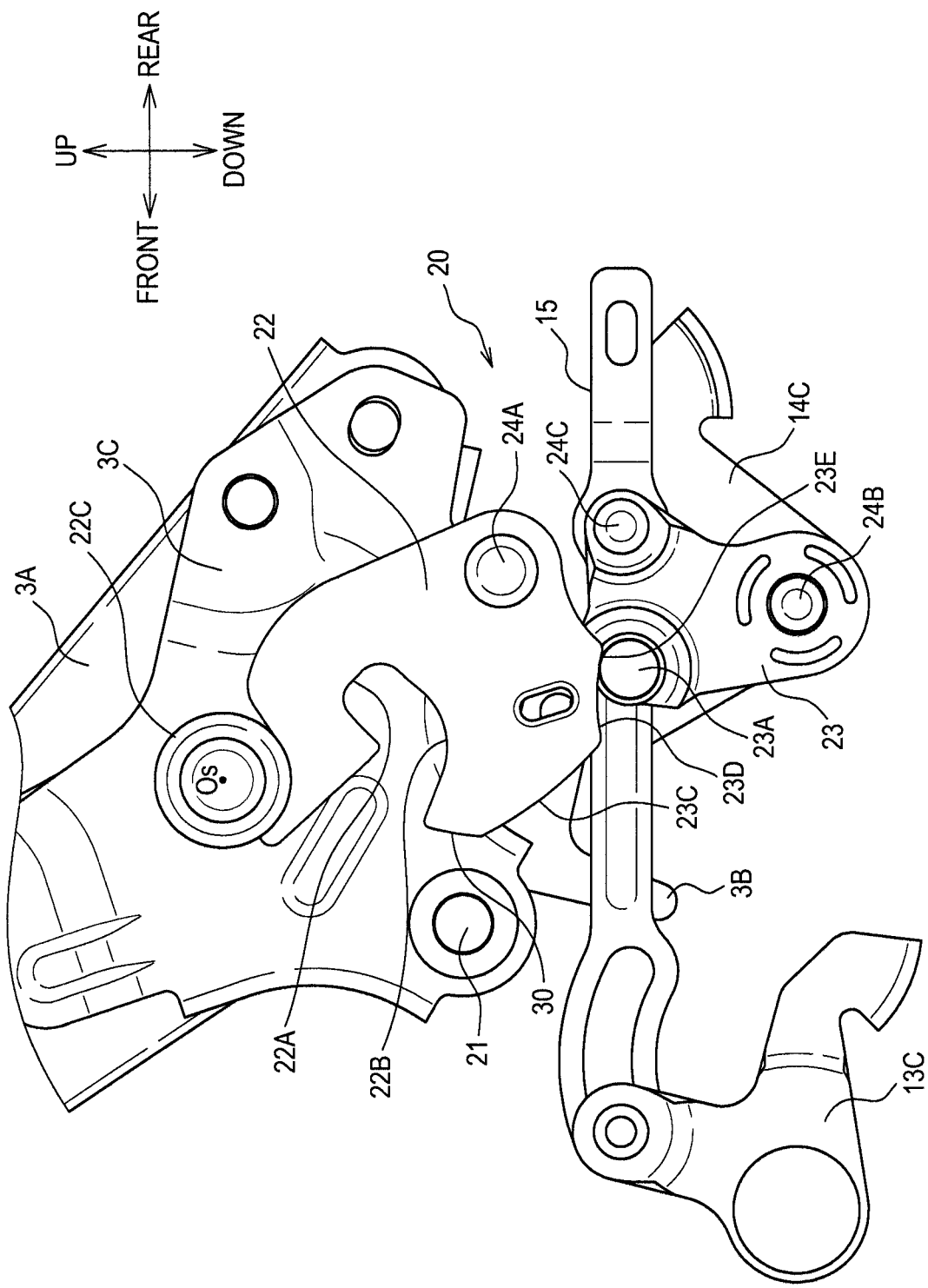
FIG. 9 is a diagram showing elements such as the tip-up mechanism.

As shown in FIG. 9, the cushion frame 3A comprises a second restrictor 22C. The second restrictor 22C is configured to restrict the engagement hook 22 from rotating beyond a preset point when the engagement hook 22 is rotationally displaced from the hook engaged position towards the hook disengaged position.

More specifically, the second restrictor 22C is formed at the cushion center Os. The engagement hook 22 contacts the second restrictor 22C when the engagement hook 22 is rotationally displaced from the hook engaged position towards the hook disengaged position. The engagement hook 22 is thereby restricted from rotating beyond the preset point.

<Rotation Plate>

As shown in FIG. 7, the rotation plate 23 is rotatably supported via a shaft 24B. A center axis of the shaft 24B coincides with a rotation center axis of the second operation lever 14C. The shaft 24B and the cushion center Os are located on opposite sides of the manipulation link 15.

The rotation plate 23 is rotatably coupled to the manipulation link 15 via a shaft 24C. Thus, the rotation plate 23 is rotationally displaced about the shaft 24B in conjunction with the movement of the manipulation link 15 in response to the displacement of the manipulation link 15. In other words, the rotation plate 23 is rotationally displaced in conjunction with the rotational operation of the seatback 5.

A press pin 23A is formed on a leading end of the rotation plate 23, which is a point on the press pin 23A spaced apart from the shaft 24B. The press pin 23A is rotationally slidingly displaced integrally with the rotation plate 23 in conjunction with slide-contacting one of a first cam surface 23C, a second cam surface 23D, or a third cam surface 23E shown in FIG. 11.

<First Cam Surface; Second Cam Surface; and Third Cam Surface>

The first cam surface 23C, the second cam surface 23D, and the third cam surface 23E are located in the engagement hook 22. The first cam surface 23C and the second cam surface 23D slide-contact the press pin 23A when the rotation plate 23 is rotationally displaced.

Accordingly, the first cam surface 23C and the second cam surface 23D receives, from the press pin 23A, a force to rotationally displace the engagement hook 22 towards the hook disengaged position. In other words, when the manipulation link 15 is displaced rearwards, the engagement hook 22 receives the force from the first cam surface 23C or the second cam surface 23D and is displaced towards the hook disengaged position.

More specifically, when the press pin 23A reaches the second cam surface 23D via the first cam surface 23C, the press pin 23A allows the force, which is for rotationally displacing the engagement hook 22 from the hook engaged position towards the hook disengaged position, to act on the first cam surface 23C and the second cam surface 23D.

The first cam surface 23C and the second cam surface 23D are configured such that a second rotational displacement angle is smaller than a first rotational displacement angle. The first rotational displacement angle is a moving angle of the engagement hook 22 during the time that the press pin 23A contacts the first cam surface 23C. The second rotational displacement angle is a moving angle of the engagement hook 22 during the time that the press pin 23A contacts the second cam surface 23D.

More specifically, a curvature center of the first cam surface 23C and the press pin 23A are located on opposite sides of the first cam surface 23C (see FIG. 10). A curvature center of the second cam surface 23D and the press pin 23A are located on the same side of the second cam surface 23D (see FIG. 8).

Figure 11:
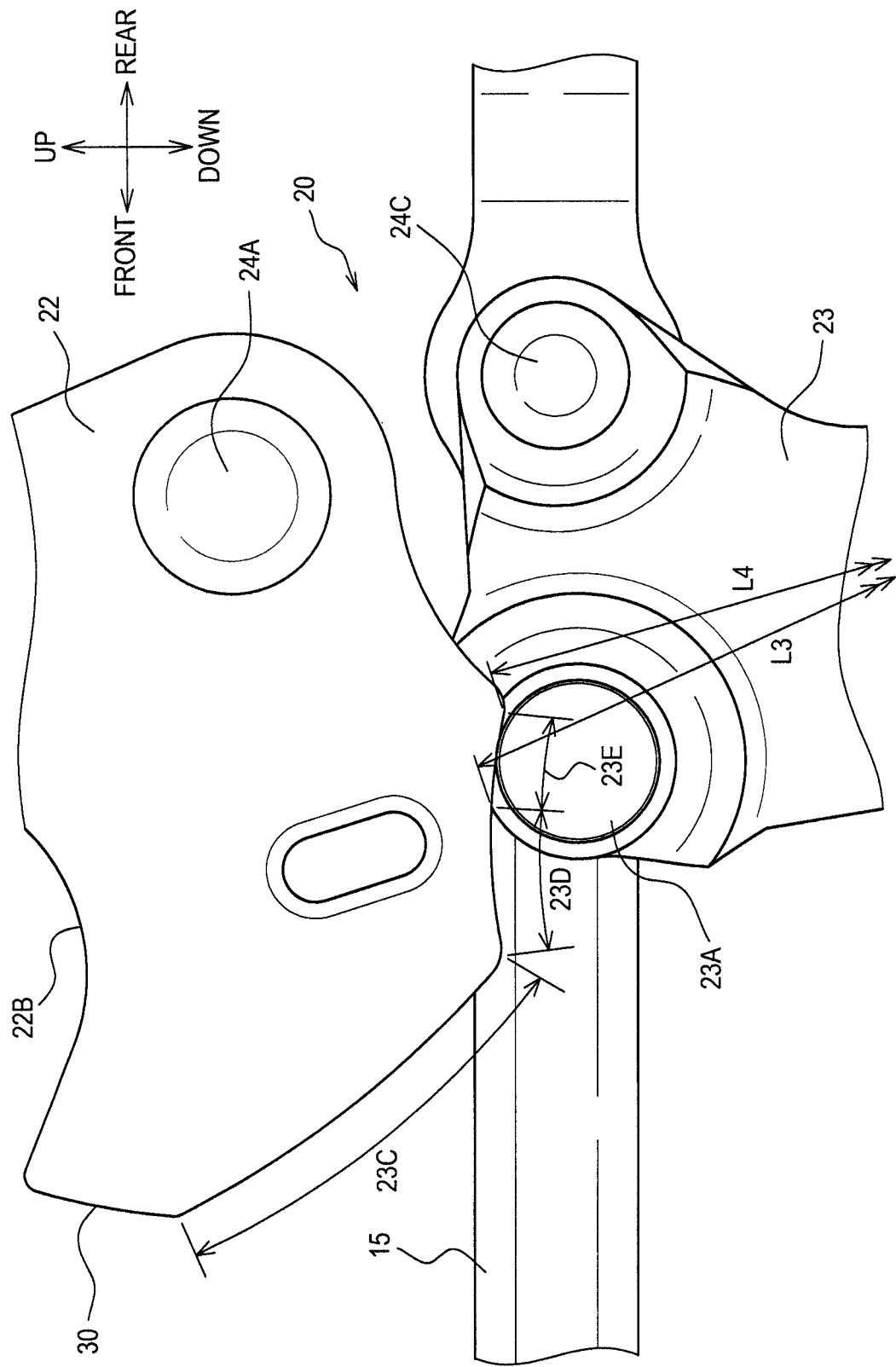
FIG. 11 is a diagram showing elements such as the tip-up mechanism.

As shown in FIG. 11, the third cam surface 23E is configured to contact the press pin 23A when the engagement hook 22 is placed in the hook disengaged position. The third cam surface 23E is configured to generate a force to rotationally displace the engagement hook 22 from the hook disengaged position towards the hook engaged position when the press pin 23A is displaced from the third cam surface 23E towards the second cam surface 23D.

More specifically, the third cam surface 23E is configured such that a distance between a given point on the third cam surface 23E and a rotation center of the rotation plate 23 increases as a distance between the given point and the second cam surface 23E decreases. In other words, the third cam surface 23E is configured such that a distance between the third cam surface 23E and the rotation center of the rotation plate 23 taken at a front point of the third cam surface 23E is greater than a distance between the third cam surface 23E and the rotation center of the rotation plate 23 taken at a rear point of the third cam surface 23E. Accordingly in FIG. 11, a distance L3, which is a distance between the rotation center of the rotation plate 23 and a point on the third cam surface 23E proximal to the second cam surface 23D, is greater than a distance L4, which is a distance between the rotation center of the rotation plate 23 and another point on the third cam surface 23E distal to the second cam surface 23D.

4. Restrictor

The first restrictor 30 is configured to restrict the elevation angle of the seat cushion 3 from being equal to or below the removal angle when the tip-up mechanism 20 is activated (see FIG. 12). More specifically, when the tip-up mechanism 20 is activated and the seatback 5 and the seat cushion 3 are placed in the positions shown in two-dot-chain lines in FIG. 1, the first restrictor 30 restricts the elevation angle of the seat cushion 3 from being equal to or below the removal angle.

Figure 12:
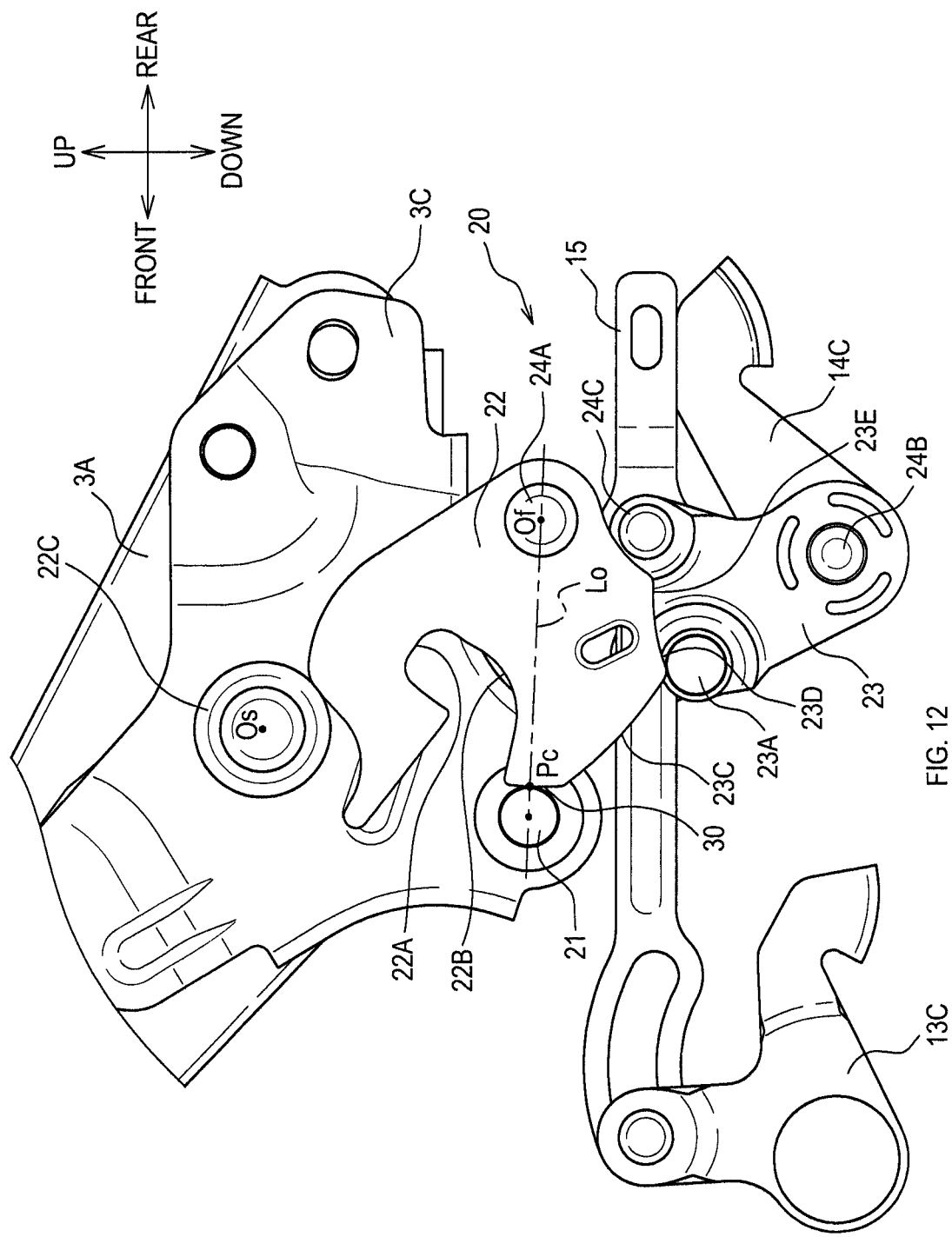
FIG. 12 is a diagram showing elements such as the tip-up mechanism.

As shown in FIG. 12, the first restrictor 30 is formed on the engagement hook 22. The elevation angle of the seat cushion 3 is restricted from being equal to or below the removal angle by having the engagement pin 21 contact the first restrictor 30 when the tip-up mechanism 20 is activated.

More specifically, the first restrictor 30 includes a curved surface; and a curvature center of a contact point Pc on the curved surface is located on a longitudinal line Lo or closer to the cushion center Os from the longitudinal line Lo. In FIG. 12, the curvature center is positioned on the longitudinal line Lo.

A hook center Of is a rotation center of the engagement hook 22. The contact point Pc is a contact point of the first restrictor 30 contacting the engagement pin 21. The longitudinal line Lo is a line passing through the contact point Pc and the hook center Of.

5. Characteristics of Vehicle Seat of Present Embodiment

The vehicle seat 1 according to the present embodiment comprises the first restrictor 30 configured to restrict the elevation angle of the seat cushion 3 from being equal to or below the removal angle when the tip-up mechanism 20 is activated.

Accordingly, in the vehicle seat 1, the seat cushion 3 is inhibited from being placed in the occupiable state when the seatback 5 is rotating. Thus, in the vehicle seat 1, release of the sub locking mechanism 14 is inhibited when the seat main body 2 largely slides frontward.

When the tip-up mechanism 20 is activated, by having the first restrictor 30 located on the engagement hook 22 and having the engagement pin 21 contact the first restrictor 30, the elevation angle is restricted form being equal to or below the removal angle. Accordingly, the vehicle seat 1 can inhibit release of the sub locking mechanism 14 by using the already-existing engagement hook 22.

The first restrictor 30 includes a curved surface; and the curvature center of the contact point Pc is located on the longitudinal line Lo or closer to the cushion center Os than to the longitudinal line Lo. The engagement hook 22 is thereby inhibited from being rotationally displaced towards the hook engaged position when the engagement hook 22 is pressed by the engagement pin 21

The push slope 22B of the engagement hook 22 allows a force, which is for moving the engagement pin 21 apart from the recess 22A, to act on the engagement pin 21 when the engagement hook 22 is rotationally displaced from the hook engaged position towards the hook disengaged position. The third locking mechanism, which is for retaining the seat cushion 3 in the occupiable position, is thereby reliably released.

The push slope 22B contacting the engagement pin 21 is called a contacting push slope, the contacting push slope is a surface configured such that a distance between the contacting push slope and the cushion center Os increases as a distance between the contacting push slope and the recess 22A increases. The third locking mechanism is thereby reliably released.

The first cam surface 23C and the second cam surface 23D are configured such that the second rotational displacement angle is smaller than the first rotational displacement angle. It is thereby possible to inhibit the engagement hook 22 from being rotationally displaced to a position where the engagement pin 21 can no longer contact the first restrictor 30.

The curvature center of the first cam surface 23C and the press pin 23A are located on opposite sides of the first cam surface 23C. The curvature center of the second cam surface 23D and the press pin 23A are located on the same side of the second cam surface 23D. It is thereby possible to inhibit the engagement hook 22 from being rotationally displaced to a position where the engagement pin 21 can no longer contact the first restrictor 30.

The third cam surface 23E is configured to generate a force to rotationally displace the engagement hook 22 from the hook disengaged position towards the hook engaged position when the press pin 23A is displaced from the third cam surface 23E towards the second cam surface 23D. The engagement hook 22 is thereby reliably rotationally displaced towards the hook engaged position.

The third cam surface 23E is configured such that a distance between a given point on the third cam surface 23E and a rotation center of the rotation plate 23 increases as a distance between the given point and the second cam surface 23D decreases. In other words, the third cam surface 23E is configured such that a distance between the third cam surface 23E and the rotation center of the rotation plate 23 taken at a point on the third cam surface 23E proximal to the second cam surface 23D is greater than a distance between the third cam surface 23E and the rotation center of the rotation plate 23 taken at a point on the third cam surface 23E distal to the second cam surface 23D. The engagement hook 22 is thereby reliably rotationally displaced towards the hook engaged position.

The vehicle seat 1 comprises the second restrictor 22C configured to restrict the engagement hook 22 from rotating beyond the preset point when the engagement hook 22 is rotationally displaced from the hook engaged position towards the hook disengaged position. It is thereby possible to reliably inhibit the engagement hook 22 from being rotationally displaced to a position where the engagement pin 21 can no longer contact the first restrictor 30.

OTHER EMBODIMENTS

In the aforementioned embodiment, the engagement pin 21 and the engagement hook 22 are provided as the third locking mechanism to retain the seat cushion 3 in the occupiable position. Nevertheless, the present disclosure should not be limited to this configuration.

In the aforementioned embodiment, the first restrictor 30 is formed on a leading end of the engagement hook 22. Nevertheless, the present disclosure should not be limited to this configuration. For example, the first restrictor 30 may also be formed on other elements different from the engagement hook 22.

The first restrictor 30 in the aforementioned embodiment is configured to restrict the elevation angle of the seat cushion 3 from being equal to or below the removal angle when the tip-up mechanism 20 is activated. Nevertheless, the present disclosure should not be limited to this configuration.

In the aforementioned embodiment, the first restrictor 30 includes a curved surface; and the curvature center of the contact point Pc is located on the longitudinal line Lo. Nevertheless, the present disclosure should not be limited to this configuration. For example, the contact point Pc may be configured to be located closer to the cushion center Os than to the longitudinal line Lo, or configured alternatively.

In the aforementioned embodiment, the engagement hook 22 comprises the push slope 22B. Nevertheless, the present disclosure should not be limited to this configuration. For example, the push slope 22B may be omitted.

In the aforementioned embodiment, the contacting push slope is configured such that the distance between the contacting push slope and the cushion center Os increases as the distance between the contacting push slope and the recess 22A increases. Nevertheless, the present disclosure should not be limited to this configuration.

In the aforementioned embodiment, the press pin 23A is configured to allow the force, which is for rotationally displacing the engagement hook 22 from the hook engaged position towards the hook disengaged position, to act on the first cam surface 23C and the second cam surface 23D when the press pin 23A reaches the second cam surface 23D via the first cam surface 23C. Nevertheless, the present disclosure should not be limited to this configuration.

In the aforementioned embodiment, the first cam surface 23C and the second cam surface 23D are configured such that the second rotational displacement angle is smaller than the first rotational displacement angle. Nevertheless, the present disclosure should not be limited to this configuration.

In the aforementioned embodiment, the curvature center of the first cam surface 23C and the press pin 23A are located on opposite sides of the first cam surface 23C; and the curvature center of the second cam surface 23D and the press pin 23A are located on the same side of the second cam surface 23D. Nevertheless, the present disclosure should not be limited to this configuration.

In the aforementioned embodiment, the engagement hook 22 is configured to comprise the third cam surface 23E that the press pin 23A contacts when the engagement hook 22 is placed in the disengaged position. Nevertheless, the present disclosure should not be limited to this configuration. For example, the third cam surface 23E may be omitted.

In the aforementioned embodiment, the third cam surface 23E is configured to generate a force to rotationally displace the engagement hook 22 from the hook disengaged position towards the hook engaged position when the press pin 23A is displaced from the third cam surface 23E towards the second cam surface 23D. Nevertheless, the present disclosure is not limited to this configuration.

In the aforementioned embodiment, the third cam surface 23E is configured such that a distance between the third cam surface 23E and a rotation center of the rotation plate 23 taken at a point on the third cam surface 23E proximal to the second cam surface 23D is greater than a distance between the third cam surface 23E and the rotation center of the rotation plate 23 taken at a point on the third cam surface 23E distal to the second cam surface 23D. Nevertheless, the present disclosure is not limited to this configuration.

In the aforementioned embodiment, the vehicle seat 1 comprises the second restrictor 22C configured to restrict the engagement hook 22 from rotating beyond the preset point when the engagement hook 22 is rotationally displaced from the hook engaged position towards the hook disengaged position. Nevertheless, the present disclosure should not be limited to this configuration. For example, the second restrictor 22C may be omitted.

The aforementioned embodiments described examples of a vehicle seat of a vehicle. Nevertheless, the present disclosure should not be limited to these examples and may be applied to seats used in other vehicles, such as railroad vehicles, ships and boats, and aircrafts, as well as built-in seats used in theaters, households, and the like.

Furthermore, the present disclosure should not be limited to the aforementioned embodiments as long as it falls within the spirit of the disclosure described in the aforementioned embodiments. Accordingly, the present disclosure may be configured in combination of at least two of the aforementioned embodiments or may be the aforementioned embodiments configured without either the configuration requirements described in the drawings or the elements described with reference numerals.

What is claimed is:

1. A vehicle seat configured to be mounted to a vehicle, the vehicle seat comprising:
    a seat cushion configured to support the buttocks of an occupant and configured to be rotatable in up-down directions about its rear end;
    a seatback configured to support the back of the occupant and configured to be rotatable in front-rear directions about its lower end;
    a sliding device configured to slidably support a seat main body, the seat main body including the seat cushion and the seatback;
    a first locking mechanism configured to be located on the sliding device and restrict a sliding movement of the seat main body when the seat cushion and the seatback are placed in an occupiable state;
    a tip-up mechanism configured to rotationally displace the seat cushion upwardly from an occupiable position in conjunction with a frontward rotational movement of the seatback;
    a second locking mechanism configured to be located on the sliding device, restrict a sliding movement of the seat main body when an elevation angle of the seat cushion exceeds a preset angle by an operation of the tip-up mechanism, and remove the restriction when the elevation angle is equal to or below a preset removal angle; and
    a first restrictor configured to restrict the elevation angle to an angle larger than the removal angle when the tip-up mechanism is activated.

2. A vehicle seat configured to be mounted to a vehicle, the vehicle seat comprising:
    a seat cushion configured to support the buttocks of an occupant and configured to be rotatable in up-down directions about its rear end;
    a seatback configured to support the back of the occupant and configured to be rotatable in front-rear directions about its lower end;
    a sliding device configured to slidably support a seat main body, the seat main body including the seat cushion and the seatback;
    a first locking mechanism configured to be located on the sliding device and restrict a sliding movement of the seat main body when the seat cushion and the seatback are placed in an occupiable state;
    a tip-up mechanism configured to rotationally displace the seat cushion upwardly from an occupiable position in conjunction with a frontward rotational movement of the seatback;
    a second locking mechanism configured to be located on the sliding device, restrict a sliding movement of the seat main body when an elevation angle of the seat cushion exceeds a preset angle by an operation of the tip-up mechanism, and remove the restriction when the elevation angle is equal to or below a preset removal angle; and
    a first restrictor configured to restrict the elevation angle from being equal to or below the removal angle when the tip-up mechanism is activated,
    wherein the tip-up mechanism comprises a third locking mechanism for retaining the seat cushion in the occupiable position,
    wherein the third locking mechanism includes an engagement pin and an engagement hook,
    wherein the engagement pin is located in the seat cushion,
    wherein the engagement hook is rotationally displaceable between a hook engaged position, which is for an engagement with the engagement pin, and a hook disengaged position where the engagement is released, and
    wherein the first restrictor is located in the engagement hook and configured to restrict the elevation angle from being equal to or below the removal angle when the tip-up mechanism is activated in response to the engagement pin contacting the first restrictor.

3. The vehicle seat according to claim 2, further comprising:
    a cushion center located at a rotation center of the seat cushion;
    a hook center located at a rotation center of the engagement hook;
    a contact point of the first restrictor that contacts the engagement pin; and
    a longitudinal line that passes through the contact point and the hook center,
    wherein the first restrictor includes a curved surface, and
    wherein a curvature center of the contact point is located on the longitudinal line or closer to the cushion center than to the longitudinal line.

4. The vehicle seat according to claim 2,
    wherein the engagement hook comprises:
        an approximately U-shaped recess that allows entrance and exit of the engagement pin; and
        a push slope that extends from the recess in a direction away from the recess and continues from an inside wall surface of the recess,
        wherein the push slope is configured to allow a force, which is for moving the engagement pin apart from the recess, to act on the engagement pin when the engagement hook is rotationally displaced from the hook engaged position towards the hook disengaged position.

5. The vehicle seat according to claim 4,
    wherein the push slope is configured such that, when the push slope is contacting the engagement pin, a distance between the push slope and the cushion center increases as a distance between the push slope and the recess increases.

6. The vehicle seat according to claim 2,
    wherein the tip-up mechanism comprises a rotation plate;
    wherein the rotation plate is configured to be rotationally displaced in conjunction with a rotational movement of the seatback;
    wherein the rotation plate comprises a press pin formed on a leading end of the rotation plate;
    wherein the engagement hook comprises a first cam surface and a second cam surface;

wherein the first cam surface and the second cam surface are configured to slide-contact the press pin in conjunction with a rotational displacement of the rotation plate;

wherein the first cam surface and the second cam surface are configured to receive a force to rotationally displace the engagement hook in response to the slide-contact with the press pin;

wherein the press pin is configured to allow a force, which is for rotationally displace the engagement hook from the hook engaged position towards the hook disengaged position, to act on the first cam surface and the second cam surface when the press pin reaches the second cam surface via the first cam surface; and wherein the first cam surface and the second cam surface are configured such that a rotational displacement angle of the engagement hook as the press pin contacts the second cam surface is smaller than a rotational displacement angle of the engagement hook as the press pin contacts the first cam surface.

7. The vehicle seat according to claim 6, wherein a curvature center of the first cam surface and the press pin are located on opposite sides of the first cam surface; and wherein a curvature center of the second cam surface and the press pin are located on a same side of the second cam surface.

8. The vehicle seat according to claim 6, wherein the engagement hook comprises a third cam surface to which the press pin contacts when the engagement hook is placed in the hook disengaged position; and wherein the third cam surface is configured to generate a force to rotationally displace the engagement hook from the hook disengaged position towards the hook engaged position when the press pin is displaced from the third cam surface towards the second cam surface.

9. The vehicle seat according to claim 8, wherein the third cam surface is configured such that a distance between a given point on the third cam surface and a rotation center of the rotation plate increases as a distance between the given point and the second cam surface decreases.

10. The vehicle seat according to claim 8, wherein the third cam surface is configured such that a distance between the third cam surface and a rotation center of the rotation plate taken at a front point on the third cam surface, which is proximal to the second cam surface, is greater than a distance between the third cam surface and the rotation center of the rotation plate taken at a rear point on the third cam surface, which is distal to the second cam surface.

11. The vehicle seat according to claim 2, further comprising:

a second restrictor configured to restrict the engagement hook from rotating beyond a preset point when the engagement hook is rotationally displaced from the hook engaged position towards the hook disengaged position.

* * * * *